United States Patent Office 2,803,659
Patented Aug. 20, 1957

2,803,659
TREATMENT OF α-PINENE OXIDE

Albert B. Booth and Eugene A. Klein, Jacksonville, Fla., assignors to The Glidden Company, Cleveland, Ohio, a corporation of Ohio No Drawing. Application October 30, 1953,
Serial No. 389,469

7 Claims. (Cl. 260—587)

This invention relates to the thermal conversion of α-pinene oxide to certain useful products.

The saturated bicyclic ketone pinocamphone is a major constituent of the oil of hyssop, often making up 50% or more of the oil. The related alcohol pinocampheol, which can be readily prepared by the reduction of pinocamphone, is also a constituent of hyssop oil. This essential oil is used for flavor and medicinal effect in various preparations. It is a fairly expensive oil and the oil or the dried herb *Hyssopus officinalis* are imported into this country.

It would naturally be desirable to be able to prepare the important odor and flavor substance pinocamphone from a readily available domestic raw material. α-Pinene is such a readily available and low cost domestic raw material which can be converted to its oxide by methods known to the art.

Accordingly, it is an object of the present invention to produce pinocamphone from α-pinene oxide.

Another object is to produce optically active pinocamphone from α-pinene oxide.

Another object is to produce carveol from α-pinene oxide.

Another object is to provide a novel method for producing pinocamphone.

Other objects will be apparent to those skilled in the art from the following disclosures:

It is known in the art to convert epoxides into the corresponding carbonyl compound, for example, by refluxing with dilute mineral acids. In the terpene series, however, these general methods frequently do not apply due to the fact that this series is extremely prone to rearrangement, as is well known.

It is disclosed in the literature, for example, that the action of dilute acids on α-pinene oxide yields not pinocamphone but sobrerol, pinol and α-campholene aldehyde. In no case is the original skeleton retained.

However, we have found that α-pinene oxide can be pyrolyzed to give a good yield of pinocamphone. Also, the conditions may be varied to give varying amounts of the rearrangement product carveol, which is also a valuable flavor material. These conversions are shown below:

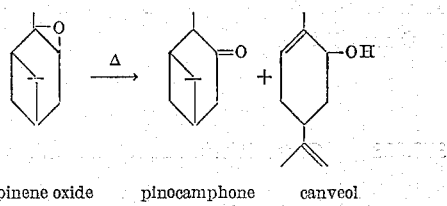

α-pinene oxide     pinocamphone     carveol

In general, a short contact time at higher temperatures favors the retention of the bicyclic system with the formation of pinocamphone, and longer contact times at lower temperatures give increasing amounts of the monocyclic derivative, carveol. Also, by prolonged heating there is produced a polymer. In this respect, α-pinene oxide behaves like other epoxides in that it will yield a resin. Since resins derived from epoxides are known to possess valuable properties in the formulation of surface coatings, etc., the production of the α-pinene oxide resin may be a desirable objective.

Pinocamphone, like menthone and some other cyclic ketones, is capable of existence in cis- and trans-forms. These are interconvertible in the presence of acids or bases, as is known. The pinocamphone occurring in hyssop oil is apparently a mixture of cis- and trans-forms. Both forms are produced by our process. They are more or less separable by fractional distillation with an efficient column, and since they are interconvertible, the pure cis- and trans-forms or mixtures of these, in any desired proportion, can readily be prepared.

Only the levorotatory pinocamphone occurs in nature, and an important feature of our invention is that the optically active levo form of pinocamphone can be produced by starting with l-α-pinene oxide. Optically pure levo α-pinene is available by isomerization of the optically pure l-β-pinene which occurs in many domestic turpentines, and epoxidation of the optically pure l-α-pinene under proper conditions, yields optically pure l-α-pinene oxide. This, as stated above, yields by our process l-pinocamphones identical with the natural products. For many applications, the optical activity of the pinocamphone may be of no importance, and for manufacture of such pinocamphone, the optical activity of the α-pinene oxide will be of no importance.

The carveol produced by our process from α-pinene oxide is predominantly the trans-form, although accompanied by a smaller amount of the cis-form. Pinocarveol may be an intermediate in the isomerization of α-pinene oxide to carveol, since this material is detectable in the pyrolysis mixture.

The following examples are illustrative:

Example 1

α-Pinene oxide was pyrolyzed by adding the material dropwise down the side of a vertical ¼-inch standard iron pipe. The temperature was determined from a thermocouple inserted down the center of the pipe. The following results were obtained under the indicated conditions:

| Temp., °C. | Rate, cc./min. | Recovered oxide | Total Alcohol | Estimated Pinocamphone |
|---|---|---|---|---|
|  |  | Percent | Percent | Percent |
| 260 | 2 | 79 | 10 | 11 |
| 315 | 2 | 12 | 15 | 60–70 |
| 350 | 2 | 12 | 10–15 | 60–70 |

The above results were determined from infrared spectrograms of the pyrolysates.

There was very little isomerization of α-pinene oxide when it was refluxed at 196–199° C. for 8 hours.

Example 2

α-Pinene oxide (550 g., $\alpha^{27}_{10\,cm.} + 42°$)

prepared from partially active d-α-pinene was pyrolyzed by adding the material dropwise at the rate of 2–3 cc. per minute down the side of a heated vertical ¼-inch standard iron pipe maintained at 400° C. The temperature was determined from a thermocouple inserted down the center of the pipe. An infrared spectrogram taken of the pyrolysate, 511 g., showed about 25% unreacted α-pinene oxide, a few percent of alcohol, and a high yield of non-conjugated carbonyl material.

The pyrolysate was fractionated through an efficient column packed with glass helices. The fractionation which was conducted at 10 mm. absolute pressure yielded twenty-two fractions ranging in size from 3.5 to 28 grams. Infrared spectra were made of several of the fractions and these indicated the number of major products, as well as their structural features.

The following compounds, in the order of their increasing boiling points, were found to be present:

A. α-Pinene oxide was the major compound boiling at 70° C. at 10 mm. Identification was made by comparison of the infrared spectra of fractions of this boiling point with the infrared spectrum of a known sample of α-pinene oxide.

B. Pinocamphone was present in the fractions boiling 75–84° C. at 10 mm. Identification was made by comparison of the infrared spectra of the fraction with an infrared spectrum of a known sample of pinocamphone. One isomer was concentrated in the fraction of approximate boiling points 78° C. at 10 mm., and the other in the fraction of approximate boiling point 81° C. at 10 mm.

The highest rotating fraction of pinocamphone from this distillation showed $$\alpha_{10\ cm.} + 7.5°$$

Since this was from α-pinene oxide having $$\alpha_{10\ cm.}^{25} + 42°\ (\text{optically pure}$$

α-pinene oxide has $\alpha_{10\ cm.}^{25} \pm 101°$)

the corresponding pinocamphone fraction from optically pure α-pinene oxide would have $$\alpha_{10\ cm.}^{25} \pm 18°\ \text{or}\ [\alpha]_D \pm 18.6°$$

C. Carveol was present in the viscous residue. The carveol was identified by comparison of the infrared spectrum of the residue with a standard infrared spectrum of carveol.

A summary of the distillation spectral data showed the crude pyrolysate to contain the following approximate yield of products:

| | Percent |
|---|---|
| Unchanged α-pinene oxide | 25 |
| Pinocamphone | 57 |
| Carveol | 2 |
| Distillation residue | 5 |
| Loss (apparently due to low-boiling cleavage products) | 11 |
| | 100 |

The percentage loss includes the difference in weight between the starting material and the pyrolysate, as well as loss on distillation.

*Example 3*

125 g. of α-pinene oxide was pyrolyzed in a stainless steel bomb at 250° C. Samples were removed periodically until the oxide was all reacted. The samples were examined by infrared spectrophotometry to follow the progress of the reaction.

The data observed are given in the following table:

| Sample No. | Time | | Oxide Remaining, g. | Total Alcohol (AsC$_{10}$H$_{16}$O), g. | Remarks |
|---|---|---|---|---|---|
| | Hours | Min. | | | |
| 1 | 3 | 45 | 95 | Trace | |
| 2 | 20 | 45 | 74 | 25 | |
| 3 | 45 | 00 | 31 | 47 | |
| 4 | 69 | 00 | 0 | 51 | 29% Pinocamphone. |

The material became increasingly viscous during the pyrolysis due to formation of resin. At the end of the heating period, the charge was steam distilled until ½ of it was obtained as steam distillate. At this point the recovery of product from the steam distillation was very slow due to difficulty in volatilizing the alcohols from the polymer. The steam distillate did, however, contain practically all the pinocamphone. Infrared spectophotometric analysis of the steam distilled material showed it contained 53% of pinocamphone and 47% of alcohol. An analysis of the total steam distillate for trans-carveol showed 25% of this product. Absorption bands for cis-carveol and pinocarveol were apparent in the spectrogram but could not be measured accurately enough for quantitative estimation. Assuming that cis-carveol was present in the equilibrium proportion of about ½ part cis- to 1 part trans-, the total carveols comprise 25+12½=37½% of the distillate. The other 9½ percent appears to be partly, if not mostly, pinocarveol. It can be seen that the recovery of pinocamphone from the pyrolyzate by steam distillation was very good, about 92%, but the recovery of the alcohols was much poorer. Part of the alcohol groups indicated in the analysis for hydroxyl are probably attached to polymeric molecules. More alcohols could be obtained by stripping the residue with steam at a higher temperature.

Having described the invention, the following claims are made:

1. The process which comprises pyrolyzing α-pinene oxide by heating the same to a temperature of at least 250° C. to form isomeric oxygenated terpene compounds of the empirical formula C$_{10}$H$_{16}$O.

2. The process of claim 1 in which the α-pinene oxide is optically active.

3. The process which comprises pyrolyzing α-pinene oxide by heating the same to a temperature of at least 250° C. and recovering pinocamphone from the pyrolyzate.

4. The process which comprises pyrolyzing α-pinene oxide by heating the same to a temperature of at least 250° C. and submitting the pyrolyzate to a fractional distillation and recovering successive fractions enriched in the lower boiling form of pinocamphone, the higher boiling form of pinocamphone, and carveol.

5. The process of claim 3 in which the α-pinene oxide is optically active.

6. The process of claim 1 in which the pyrolysis is conducted in the vapor phase.

7. The process which comprises pyrolyzing α-pinene oxide by heating the same at a temperature of about 250° C. to about 400° C.

References Cited in the file of this patent

FOREIGN PATENTS 370,823    Great Britain _ _ _ _ _ _ _ _ _ _ _ Apr. 14, 1932